(12) United States Patent
Chou et al.

(10) Patent No.: US 8,374,474 B2
(45) Date of Patent: Feb. 12, 2013

(54) OPTICAL FIBER WITH SINGLE LAYER COATING FOR FIELD TERMINATION

(75) Inventors: Kuei-Huang Chou, Miaoli (TW); Shing-wu Paul Tzeng, Irvine, CA (US); Chih-Yu Wu, Hsinchu (TW); Sheng-Hsiang Hsu, Hsinchu (TW)

(73) Assignees: Prime Optical Fiber Corporation, Miao-Li County (TW); OWLink Technology, Inc., Tustin, CA (US)

( * ) Notice: Subject to any disclaimer, the term of this patent is extended or adjusted under 35 U.S.C. 154(b) by 96 days.

(21) Appl. No.: 12/971,088

(22) Filed: Dec. 17, 2010

(65) Prior Publication Data

US 2012/0155818 A1 Jun. 21, 2012

(51) Int. Cl.
*G02B 6/02* (2006.01)
*B05D 5/06* (2006.01)

(52) U.S. Cl. ........ 385/128; 385/100; 385/101; 385/102; 385/123; 385/124; 385/125; 385/126; 385/127; 427/163.2

(58) Field of Classification Search .................. 385/100, 385/102, 123–128; 427/163.2
See application file for complete search history.

(56) References Cited

U.S. PATENT DOCUMENTS

| 4,682,850 | A | 7/1987 | White et al. |
| 5,159,653 | A | 10/1992 | Carpenter et al. |
| 5,381,504 | A | 1/1995 | Novack et al. |
| 7,280,733 | B2 | 10/2007 | Larson et al. |
| 2010/0220966 | A1* | 9/2010 | Bennett .......................... 385/124 |

FOREIGN PATENT DOCUMENTS

TW I326773 7/2010

* cited by examiner

*Primary Examiner* — Brian Healy
*Assistant Examiner* — Guy Anderson
(74) *Attorney, Agent, or Firm* — Rabin & Berdo, P.C.

(57) ABSTRACT

A structure for optical fiber with single layer coating suitable for field termination process is provided, including a glass core, a cladding layer, and a permanent coating protective layer. The thickness of the permanent coating ranges preferably from about 4 um to 8 um, and remains on the optical fiber during the field termination process to provide protection to the optical fiber after the buffer layer is striped off. In addition, the optical fiber structure of the present invention still conforms to the specification of the standard optical fiber. The optical fiber of the structure according to the present invention can simplify the field termination process so that the quality efficiency of the deployment is improved.

3 Claims, 3 Drawing Sheets

OPTICAL FIBER WITH SINGLE LAYER COATING FOR FIELD TERMINATION

FIELD OF THE INVENTION

The present invention generally relates to an optical fiber with a single layer of coating. The optical fiber with single layer coating is applicable to a simplified field termination method.

BACKGROUND OF THE INVENTION

The superiority of optical signal in the aspects of bandwidth, security and other physical characteristics, compared to the electrical signal, has made optical fiber a popular choice for signal transmission, in particular, for communication or multimedia applications. FIG. 1 shows a schematic view of a typical optical fiber. As shown in FIG. 1, A typical optical fiber includes a glass core 101, a cladding layer 102 and a buffer layer 103. Glass core 101 is the part where the optical signal actually travels. Because glass core 101, cladding layer 102 is extremely fragile and susceptible to the surface abrasion, buffer layer 103 are needed to provide protection to glass core 101. In particular, during deployment, the field termination must be performed on the optical fiber for extension or connection to other optical devices or elements. The field termination is a process includes at least the steps of: stripping the buffer layer; cleaning the stripped surface with alcohol or other solvent to remove any buffer coating remaining and debris; cleaving the terminal of the optical fiber according to specification; and performing connection through thermal splice or other mechanical means. It is worth noting that the field termination process is relative delicate task and the optical fiber is susceptible to damages caused by errors, such as, inappropriate tool and parameter adjustment, dust and other abrasion source, human error, and so on. Once damaged, the quality and the life span of the optical fiber are severely affected.

A typical field termination usually employs factory pre-polished optical connector to eliminate the need for hand polishing in the field. U.S. Pat. No. 7,280,733 disclosed a field termination optical connector, and U.S. Pat. No. 5,159,653 disclosed a mechanical splice technology. Although different manufacturers may employ different means to splice the optical fiber, the common part of the mechanical splice is to clamp on the cladding layer of the optical fiber.

Alternative optical fiber structures are developed to address the strength issue of the fiber optical. For example, U.S. Pat. No. 4,682,850 disclosed an optical fiber with single ultraviolet cured resin coating, applicable in particular to loosely wrapped cable structure. The resin coating has a thickness of about 62.5 um and the total diameter of the optical fiber is of 250 um. The thickness of resin coating is preferably no less than 50 um. The resin has a Shore A hardness of about 70 to 75.

Taiwan Patent No. I326773 disclosed an improved optical fiber structure and the manufacturing method thereof, wherein the glass comprises a plurality of microstructures formed therein to lower the risk of snapping when the optical fiber is subjected to bending by external force.

However, while the above structures provide possible solution to enhance the strength of the optical fiber, these techniques do not address the difficult issue of field termination.

U.S. Pat. No. 5,381,504 (Re. 36,146) disclosed an optical fiber element including an optical fiber having a numerical aperture ranging from 0.08 to 0.34 and a protective coating affixed to the outer surface of the optical fiber and remaining on the optical fiber during connection. As shown in FIG. 2, protective coating 101A has a thickness ranging from 8 to 23 um and a combined diameter ranging from about 120 to about 130 um. The total of the optical fiber element ranges about 240 to about 260 um. The protective coating has a Shore D [hardness] value of 65 or more. While the optical fiber structure address the issue of connection, one disadvantage of the mentioned structure is that a special cleaver is needed to perform the necessary cleaving so that the cladding layer would be slightly cleaved to enable subsequent snapping of the glass core. An alternative is for the engineer to re-adjust the cleaving thickness of the cleaver. Neither of the above two cleaving alternatives is satisfactory and may impede the optical fiber deployment efficiency and quality.

It is therefore imperative to devise an optical fiber structure to facilitate the field termination process, the deployment quality and efficiency issues.

SUMMARY OF THE INVENTION

The present invention has been made to overcome the above-mentioned drawback of conventional optical fiber structures. The primary object of the present invention is to provide a structure for optical fiber with single layer coating suitable for field termination.

An exemplary embodiment of the present invention discloses a structure for optical fiber suitable for field termination, including a glass core, a cladding layer, and a permanent coating. The thickness of the permanent coating ranges from about 4 um to 8 um, and remains on the optical fiber during the field termination process to provide protection to the optical fiber. There is no need to strip the buffer coating. In addition, the optical fiber structure of the present invention still conforms to the specification of the standard optical fiber.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
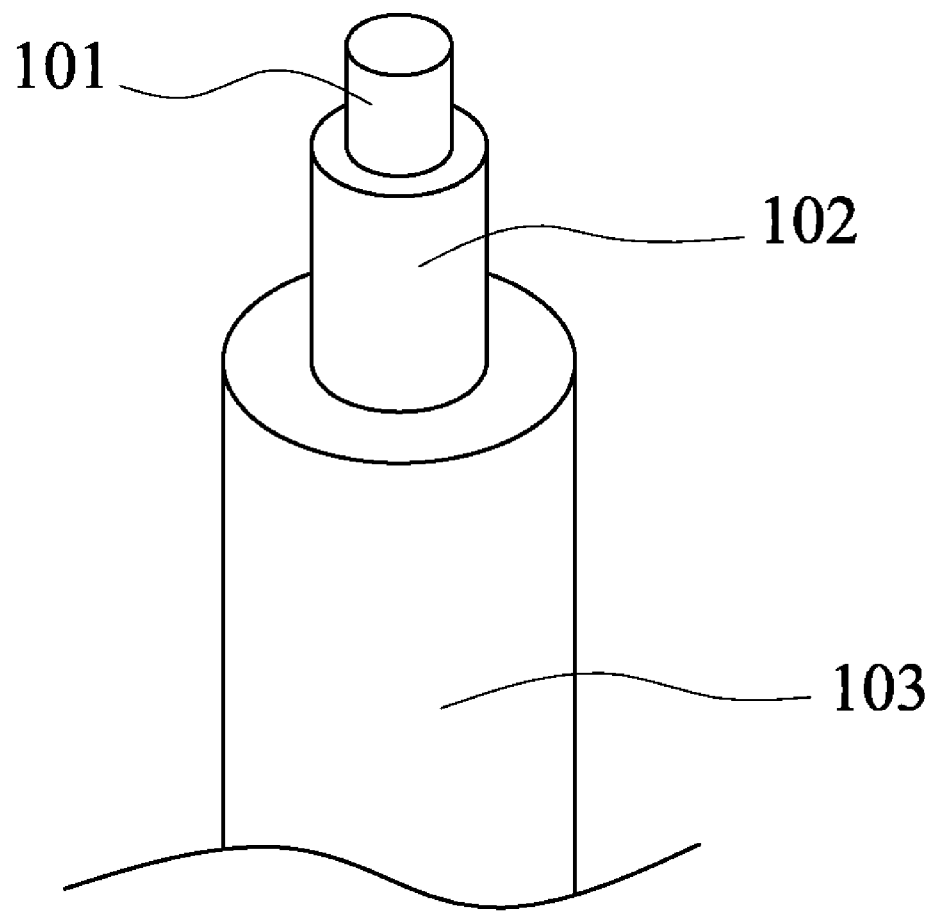
FIG. 1 shows a schematic view of a conventional optical fiber structure.
Figure 2:
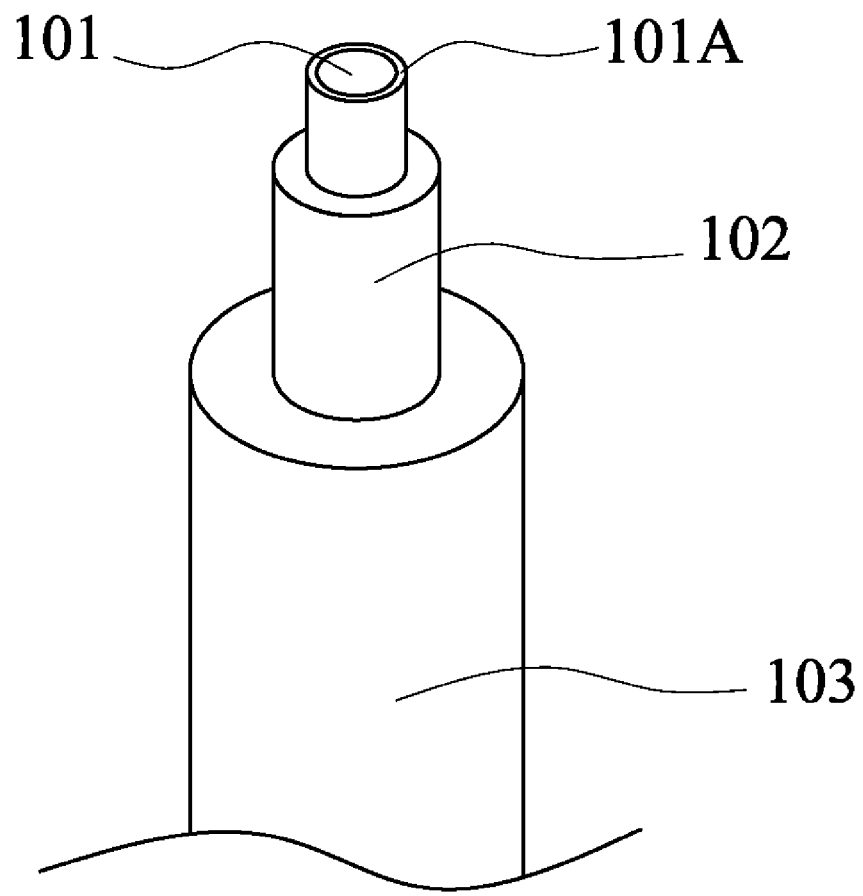
FIG. 2 shows a schematic view of a conventional optical fiber structure with a permanent protective coating.
Figure 3:
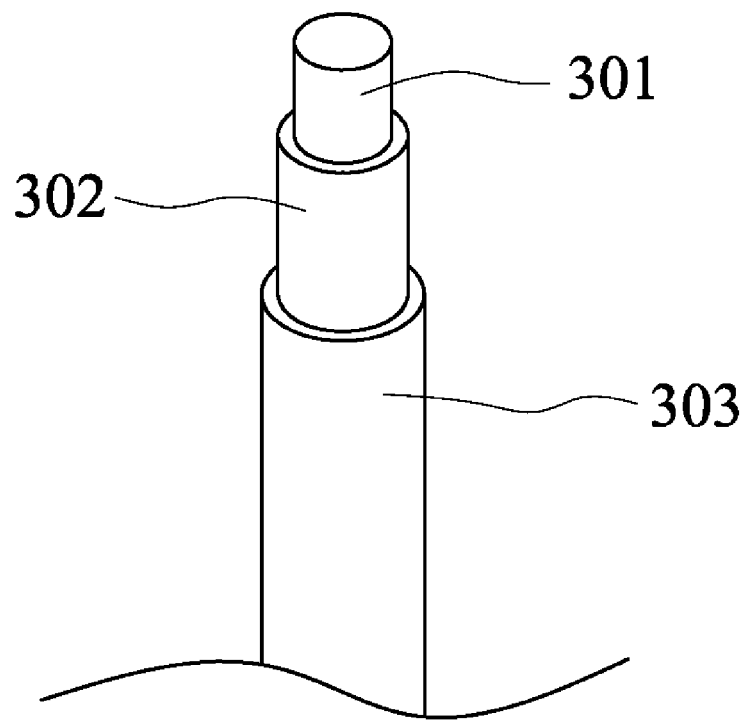
FIG. 3 shows a schematic view of the structure of optical fiber with single layer coating according to the present invention.

FIG. 3 shows a schematic view of a structure of optical fiber with single layer coating according to the invention, including a glass core 301, a cladding layer 302 and a permanent coating 303. In order to make the final specification of the optical fiber of the present invention conforms to standard specification, the combined outer diameter (OD) of cladding layer 302 is reduced slightly from the conventional 125 um to ranging from about 109 um to 117 um, and the thickness of permanent coating ranges from about 4 um to 8 um. Hence, the combined outer diameter of the permanent coating will remain 125 um to conform to the standard. It is worth noting the slight diameter reduction of cladding layer 302 will not affect the optical signal transmission in glass core 301 of the optical fiber. It is also worth noting that the optical fiber structure of the present invention does not include a buffer layer. Permanent coating 303 can be, for example, a polymer coating disposed on cladding layer 302 to function as the conventional buffer layer to protect the glass-based optical fiber.

With the optical fiber of the structure according to the present invention, the field termination process can be greatly simplified. In particular, because the optical fiber no longer includes a buffer layer, the steps of striping the buffer layer, and cleansing with alcohol to remove the buffer remains or debris in the preparation for conventional field termination process is no longer necessary. Therefore, the preparation for field termination process requires only the step of cleaving the fiber with a fiber cleaver according to the cleave specification. Furthermore, a common cleaver, instead of a specially designed cleaver or a cleaver requiring engineering re-adjustment. In summary, the optical fiber of the structure according to the present invention will simplify the field termination process so that the quality efficiency of the deployment is greatly improved.

In comparison with the conventional optical fiber structure, the optical fiber with single layer coating according to the present invention will eliminate the steps related to stripping buffer layer and cleansing the buffer layer residual and debris in the conventional field termination process so as to avoid the related possible damages caused by the stripping step at buffer layer in the conventional optical fiber structure. Hence, the deployment quality and efficiency of the field termination process is greatly improved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An optical fiber, comprising:
   a glass core;
   a cladding layer covering the glass core and having a combined outer diameter of about 109 um to 117 um; and
   a permanent coating covering the cladding layer and having a thickness of about 4 um to 8 um, such that a combined outer diameter of said glass core, said cladding layer and said permanent coating is 125 um.

2. The optical fiber of claim 1, wherein said permanent coating is a polymer coating that protects said cladding layer and said glass core.

3. The optical fiber of claim 1, wherein the permanent coating is an outermost layer of the optical fiber.

* * * * *